United States Patent [19]

Greenlee

[11] 4,433,262
[45] Feb. 21, 1984

[54] METHOD OF LOCKING CONDUCTORS IN A DYNAMOELECTRIC MACHINE ROTOR AND ROTOR HAVING LOCKED CONDUCTORS

[75] Inventor: Paul W. Greenlee, Hendersonville, Tenn.

[73] Assignee: General Electric Company, Fort Wayne, Ind.

[21] Appl. No.: 965,034

[22] Filed: Nov. 30, 1978

[51] Int. Cl.³ .............................................. H02K 3/48
[52] U.S. Cl. ...................................... 310/214; 310/45; 310/269
[58] Field of Search ............... 310/194, 214, 215, 269, 310/45

[56] References Cited

U.S. PATENT DOCUMENTS

| | | | |
|---|---|---|---|
| 880,429 | 2/1908 | Treat | 310/214 |
| 2,581,445 | 1/1952 | Riley | 310/214 |
| 2,986,663 | 5/1961 | Ellis | 310/214 |
| 3,150,280 | 9/1964 | Little | 310/215 |
| 3,355,610 | 11/1967 | Staff | 310/214 |
| 4,147,946 | 4/1979 | Linscott | 310/214 |
| 4,160,926 | 7/1979 | Cope | 310/215 |

Primary Examiner—R. Skudy
Attorney, Agent, or Firm—Vale P. Myles

[57] ABSTRACT

A method of locking coiled conductors in slots of a dynamoelectric machine rotor by placing deformable locking members over selected axially limited areas of the coiled conductors and driving the ends of the locking members under tips of salient rotor poles to secure the locking members firmly in position against the outer surfaces of the conductors. In one form of the invention preformed sheets of insulating material are positioned around the coiled conductors and under the deformable locking members to insulate the coils from the sides of the rotor poles and from the locking members. An aspect of the invention includes the combination in a dynamoelectric machine rotor of a plurality of deformable locking members positioned to secure coiled conductors in rotor slots and to secure preformed sheets of insulating material between the outer surfaces of the conductors and the locking members when they are arranged in their coil-locking positions.

7 Claims, 5 Drawing Figures

METHOD OF LOCKING CONDUCTORS IN A DYNAMOELECTRIC MACHINE ROTOR AND ROTOR HAVING LOCKED CONDUCTORS

BACKGROUND OF THE INVENTION

The invention relates to a method of locking coiled conductors in slots of a dynamoelectric machine rotor and also is concerned with particular locking members used in combination with a salient-pole rotor to lock coiled conductors in operating position around the poles of the rotor It is well known by those engaged in the design and manufacture of salient-poled dynamoelectric machine rotors, such as those used in synchronous generators, that it is desirable to expose as much of the energizing windings as possible directly to the air around the rotor. The reason for maximizing such exposure is to facilitate cooling of the conductors, which are otherwise thermally insulated by being tightly packed in slots defined by the respective sides of the rotor poles. It is also a necessary design consideration to assure that the coiled conductors are tightly secured in the slots with sufficient holding force to retain them in their optimum operating positions against the cenrifugal force that is exerted on the conductors when the rotor is placed in operation. In the past, two primary techniques were used to secure such coiled conductors in their slots. For relatively small diameter rotors, a coarse tape, or roving, was wound around and between the coiled conductors and securely tied to hold them in place in the rotor slots. For larger rotors, that frequently develop greater centrifugal forces on the rotor conductors, the usual practice was to provide two or more insulated studs threaded into the center of each rotor slot prior to winding the conductors in the slots. After such winding was completed, an insulated metal clip as fastened down against the coiled conductors by mounting the clip over the conductors and forcing it toward them by tightening threaded nuts on the studs mounted in the slots.

Such prior art technology, while effective to afford the desired objective of securing the rotor conductors in operating position, did involve certain disadvantages. The use of roving tied to coiled rotor conductors to secure them in operating position is a relatively expensive process due to the level of skill required to effectively employ it. Moreover, even a skilled assembler requires considerable time to properly tie a rotor winding in operating position with this technique. The primary disadvantages of using threaded studs to secure rotor windings in operating position is that such assemblies are relatively costly and the studs protrude from the winding slots thus interfering with an assembler engaged in winding magnet wire in the slots.

In addition to the two foregoing techniques that are usually employed in manufacturing rotors having random wound windings, other conductor securing techniques and locking means are known. For example, U.S. Pat. No. 2,745,030 discloses a U-shaped wedge that is mounted over a form wound coil of a rotor then swedged into recesses provided in the rotor above the form wound conductors in order to lock the conductors in the winding slots of the rotor. U.S. Pat. No. 1,564,449 describes the use of a resilient clip that is pressed into a rotor slot in a deformed condition and then allowed to straighten so that the ends of the clip extend, respectively, under the tips of poles forming the periphery of the rotor. In their expanded positions, the resilient clips operate to hold conductors in operating position in winding slots that are located directly beneath the clips on the rotor. A somewhat related resilient conductor retaining means is also shown in U.S. Pat. No. 1,891,200. As explained in that patent, a retaining means in the form of a deformable insulating material, such as rope, is pressed against the upper surface of a plurality of coiled conductors positioned in a winding slot of a rotor in order to drive the retaining means into the slots and cause it to expand underneath adjacent tips of salient poles that form the walls of the slots. In its expanded position the rope, or other expandable retaining means, is effective to retain the coiled conductors in the slots.

A common disadvantage of the three conductor retaining means described by the three patents just identified is that they completely cover the axial length of the conductors disposed between the ends of the winding-receiving slots. Thus, the windings cannot be optimumly cooled in the normally desired manner noted above.

Another type of relatively common rotor construction that is somewhat related to the present invention is one that uses insulating slot covers that inherently have some coil-locking benefit. Examples of such conventional slot wedges are shown in U.S. Pat. Nos.: 2,283,146; 3,355,610 and 3,519,862. As explained in the first two of these patents, it is common to use such conventional insulating slot wedges to perform additional functions, such as to limit the movement of carbon dust relative to the winding slots. Also, as indicated in the third patent just mentioned, such slot wedges often are used to provide a separation between multiple phase windings mounted in the same slots of a rotor. A common characteristic of such slot wedges, which is a disadvantage in terms of conductor cooling, is that they typically extend over the entire axial length of the conductors wound in the rotor slots. Thus, the outer surface of the coiled conductors is not exposed to the ambient for cooling, in the desirable manner described above.

OBJECTS OF THE INVENTION

A primary object of the present invention is to provide a method of locking coiled conductors in the slots of a dynamoelectric machine rotor by a process that is simple to practice and which results in the windings being securely locked in operating position, while maintaining a major portion of the outermost turns of the windings exposed to the ambient for optimum cooling.

Another object of the invention is to provide in a dynamoelectric machine rotor a coiled conductor locking apparatus that overcomes the above-noted disadvantages of prior art locking means.

Still another object of the invention is to provide a plurality of novel locking members in combination with uniquely patterned sheets of insulating material which are mounted, respectively, around random wound coils of conductors in a dynamoelectric machine rotor to lock the coiled conductors in slots of the rotor while leaving a major portion of the outer periphery of the conductors in each slot exposed to the cooling ambient.

Additional objects and advantages of the invention will be apparent to those skilled in the art from the description of it that follows.

SUMMARY OF THE INVENTION

In one preferred aspect of the invention, a method of locking coiled conductors in rotor slots of a dynomoelectric machine rotor is provided whereby generally V-shaped, deformable locking members are mounted respectively over conductors coiled in each of the rotor slots. The ends of the locking members are then driven under tips of salient poles that define the walls of the rotor slots, thereby to flatten the locking members and secure them in position under the pole tips. In a more preferred sequence of the method of the invention, a preformed sheet of insulating material is wrapped around the coiled conductors in each rotor slot to insulate the conductors from the walls of the slots and from the locking members used to secure the conductors in the slots. Another aspect of the invention provides the combination of a dynamoelectric machine rotor having coiled conductors mounted in rotor slots defined by salient poles with a plurality of deformable locking members that are secured under the tips of the rotor poles and are pressed against the outer turns of the coiled rotor windings to lock them in the slots. Except for the portions of the outer surfaces of the coiled conductors that are insulated from the locking members by sheets of insulating material wrapped around the coiled conductors and under the locking members, they are exposed to the ambient for optimum cooling.

DETAILED DESCRIPTION OF THE PREFERRED EMBODIMENTS

Figure 1:
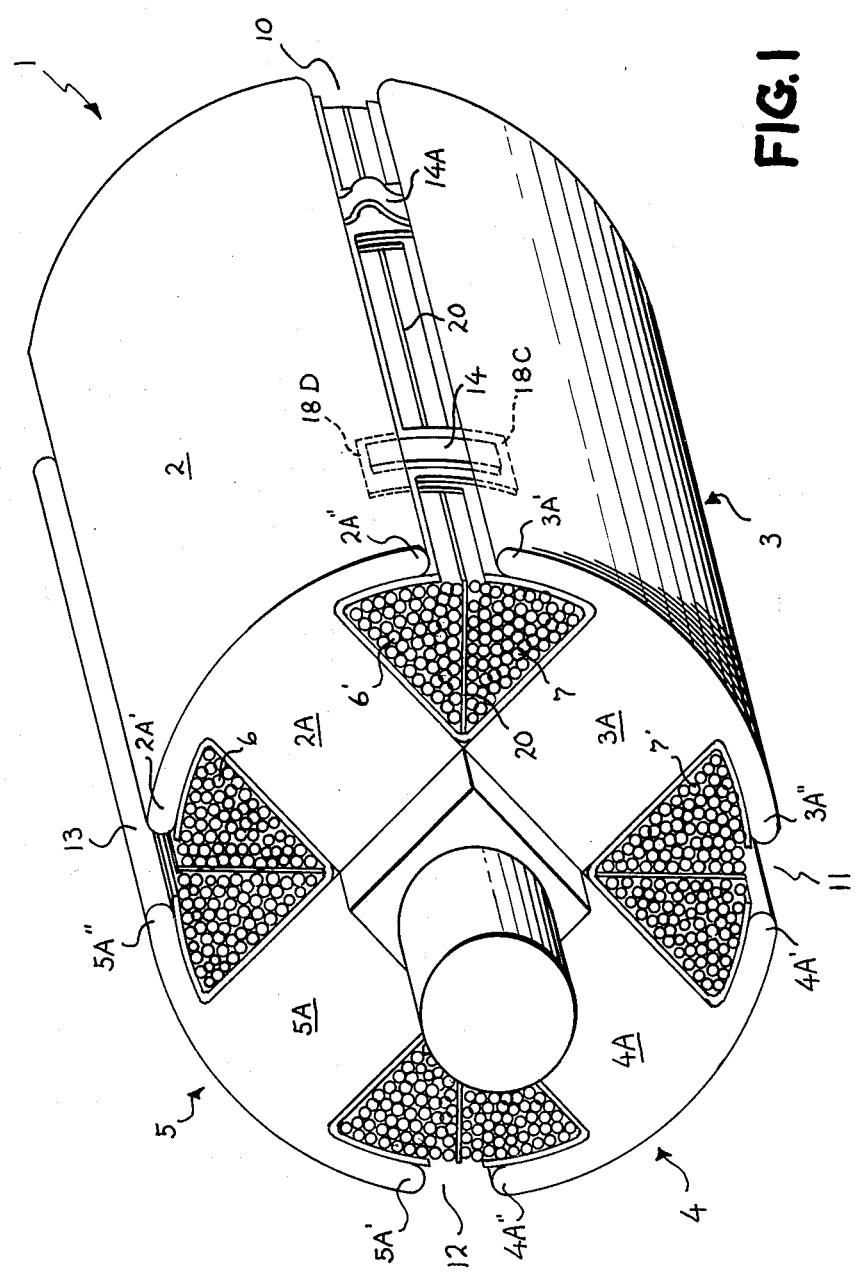
FIG. 1 is a perspective view, partly in cross-section, of a dynamoelectric machine rotor including coiled conductors that are locked in operating position by the locking apparatus of the invention, as applied by the method of the invention.
Figure 2:
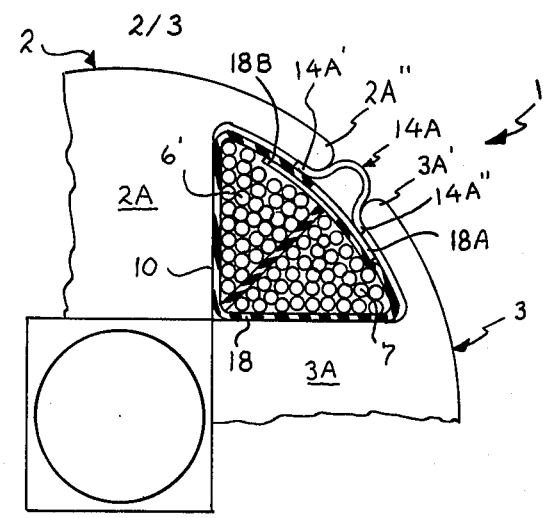
FIG. 2 is a fragmentary, side elevation, taken in cross-section along the plane 2—2 in FIG. 1, of one conductor-filled slot of the rotor depicted in FIG. 1, showing a locking member designed according to the invention and arranged over the mouth of the rotor slot in a position it would normally occupy before being flattened into operating, coil-locking position with its ends secured under the tips of the rotor poles.
Figure 3:
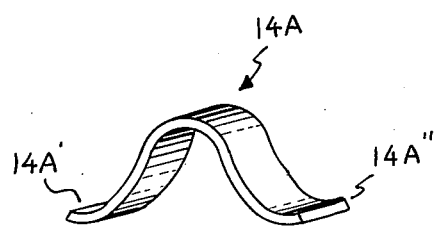
FIG. 3 is a perspective view of a rotor locking member such as that illustrated in FIG. 2.

Before describing the preferred method of locking coiled conductors in a dynomoelectric machine according to the invention, it should be understood that in practicing this method each of the locking members, such as the members 14 and 14a shown in FIG. 1 is made substantially identical in configuration to one another and is preformed into an optimum shape such as that shown in FIG. 3 of the drawing. Now, considering the method of the invention with reference to FIG. 1 where there is shown a dynamoelectric machine rotor 1 having a plurality of slots 10, 11, 12 and 13 defined, respectively, by adjacent salient poles, such as poles 2, 3, 4 and 5, a preferred sequence of process steps will be described. It will be seen that each pole is provided with tip portions 2A'-2A'', 3A'-3A'', etc., the extremities of which extend generally perpendicular to and beyond opposite sides of the outer ends of their respective shank portions 2A through 5A. The first method step of the invention is to place at least one of the generally V-shaped, stiff deformable locking members 14, 14A, etc. over the plurality of coiled conductors, such as the sides of conductors 6' and 7 shown in a given slot 10 in FIGS. 1 and 2, in a manner such that the bent ends 14A' and 14A'' of the locking member are positioned closer than the base thereof to the conductors. As can be seen in FIGS. 1 and 2, with reference to the bent locking member 14A, this arrangement places the ends of the locking member respectively on the outer surfaces of the coiled conductors 6' and 7 at point adjacent the pole tips 2A'' and 3A'. The next step in practicing the method of the invention is to force each locking member into a generally flat configuration in order to drive the respective ends 14A' and 14A'' of it under the extremities of the adjacent pole tips 2A'' and 3A' that are disposed on opposite sides of the locking member 14A. This forcing operation is preferably performed by striking the base portion of the V-shaped locking member 14A with a rubber mallet or other suitable forcing means. Before the locking members are placed into use, as just described, a desired pre-configuration of each locking member is achieved by bending its outer ends 14A' and 14A'' so that they are curved upward slightly into the configuration shown in FIG. 3 to assure that the ends of the locking member will be driven under the pole tips without rupturing the insulation on the conductors 6' and 7. The flattening step of the method, as just described, serves to secure the respective ends of each locking members 14, 14A, etc., under the respective pole tip portions adjacent to it and to position substantially the entire length of each of the locking members (assuming they are sequentially flattened by applying suitable force thereto) against the outermost coiled conductors within the slots beneath such members.

Figure 4:
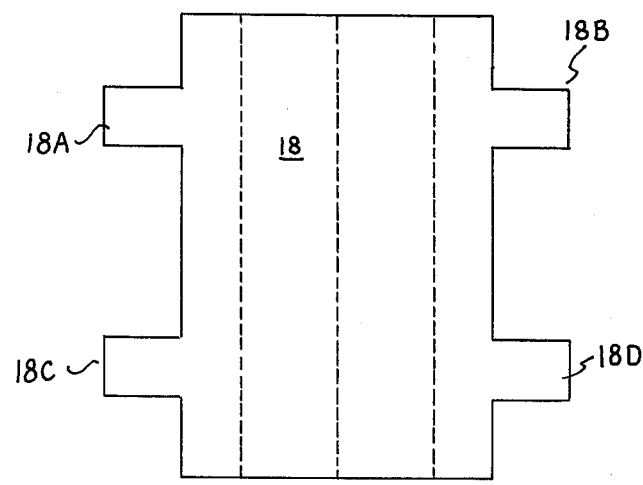
FIG. 4 is a top plan view of a sheet of insulating material provided with matched pairs of tabs expending from the respective sides thereof to provide insulation between locking members, such as those illustrated in FIGS. 1 and 2, and the coiled conductors positioned in the slot beneath such members, according to the invention.

As was explained above with reference to the description of a preferred structure for a rotor constructed according to the invention, in a most preferred embodiment sheets of insulating material such as the sheet 18 illustrated in FIG. 4, are placed around the respective sides of the coiled conductors in each of the winding slots of the rotor 1. In addition, as shown in FIG. 1, a layer of insulation 20 is placed between each of the separate pole windings in each slot, such as the windings 6' and 7 shown in slot 10. Accordingly, in practicing the most preferred embodiment of the method of the invention, prior to placing the conductors in the winding slots, a suitably preformed sheet (18) of insulating material, such as commercially available insulating paper, is placed in each of the winding slots 10–13 of the rotor 1 so that the sheets are disposed, respectively, between the pole surfaces defining each of the winding slots and the coiled conductors disposed therein. Also, according to the method of the invention each of the sheets of insulating material is provided with tabs, such as the tabs 18A–18D shown in FIG. 4. Preferably, the tabs provided on each of the sheets of insulating material are positioned so that matched pairs of tabs, 18A–18B and 18C–18D, extend from opposite sides of the respective sheets of insulating paper 18 toward one another (when the sheet is mounted in the rotor) to substantially cover the areas of the coiled conductors disposed respectively beneath the locking members, such as the members 14 and 14A shown in FIG. 1. Optimum insulation between the locking members and the coiled conductors 6', 7, etc. is assured by making the tabs 18A-18B and 18C-18D sufficiently long so that the ends of the respective tabs in each of the pairs of tabs are maintained in contact with one another while the locking members are forced to a generally flat configuration by driving their ends under the pole tip portions 2A'--3A', etc. as partly shown in FIG. 2. In some embodiments of the invention such optimum engagement of the tab ends can be achieved by adhering the ends together with a suitable glue, or by bonding them to the surfaces of the conductor 6', 7, etc. In the preferred embodiment of the invention, however, the tabs 18A-18D, etc. are made sufficiently long so that they at least overlap slightly, as best seen in FIG. 2 and preferably the tabs are each made long enough to be tucked under the opposite pole tip.

Figure 5:
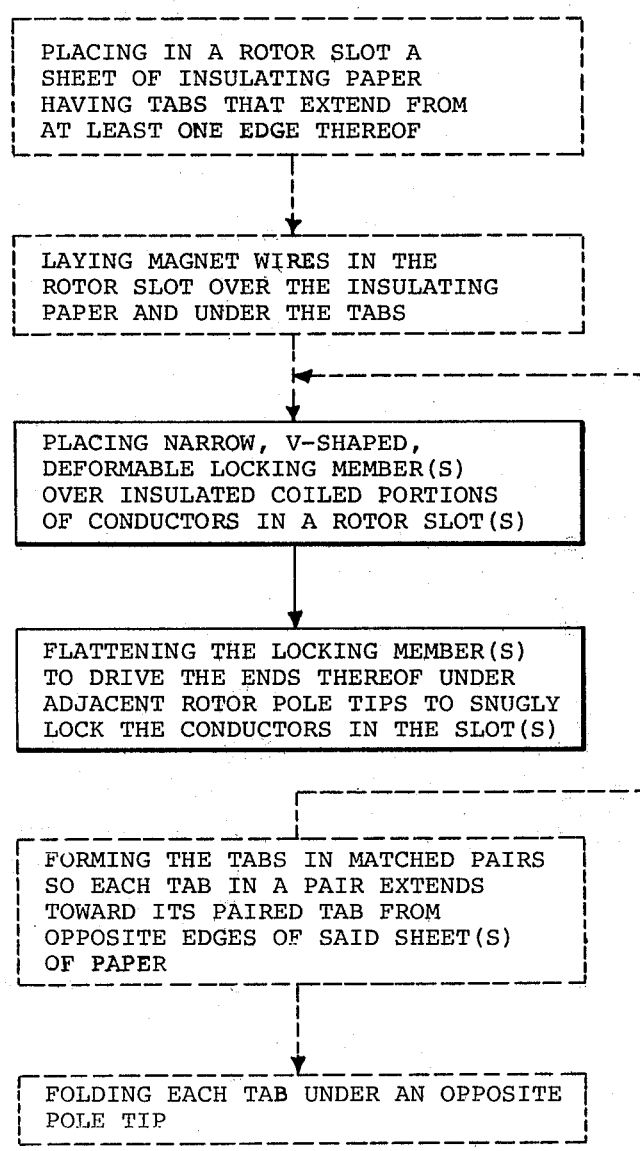
FIG. 5 is a flow chart illustrating preferred arrangements of process steps for practicing the method of the invention.

Thus, in practicing the method steps of the alternative sequence of the invention shown by the dashed portion of the chart in FIG. 5, the tabs on the sheet 18 of insulating material are formed in matched pairs so that each tab in a given pair extends toward the other paired tab from opposite edges of the sheet 18 sufficiently so that the ends of the tabs will be in engagement when held in operating position as shown in FIG. 1. Each tab is then folded to position its outer ends under the opposite pole tip, as seen in FIG. 2. The final step of the method of the invention, as it relates to each locking member 14, 14A, etc. is to strike the center of each locking member with a rubber mallet or other suitable forcing means to thus drive the ends of the locking members under the adjacent pole tips of the rotor 1 thereby to position the center of each locking member snugly against the coiled conductors.

Now that the best modes of the method of the invention have been explained with reference to FIGS. 1-5 of the drawing, the novel structural features of the invention will be described in more detail to assure a complete appreciation of the advantages afforded by the invention. Referring, again, to FIGS. 1 and 2, there is depicted, as noted above, a rotor 1, which is viewed in FIG. 2, as it would be seen along the plane 2—2 in FIG. 1. Thus, in FIG. 2, parts of the poles 2 and 3 including their respective pole tips 2A" and 3A' are shown positioned above the respective axially extending sides 6' and 7 of coiled pole conductors wrapped respectively around the poles 2 and 3. A sheet of suitable insulating material which in the preferred embodiment of the invention described herein is a resin impregnated sheet of insulating paper 18, such as Nomex paper that is commercially available from DuPont Company, Inc. of Wilmington, Del., is disposed around the coiled conductors 6' and 7 to insulate them from the poles 2 and 3 that define the slot 10. Each of the other slots 11-13 is similarly insulated from the respective conductors therein.

For a better understanding of the most preferred configuration of the sheets of insulating paper (18), reference is made to FIG. 4 where a developed view of such a sheet of paper is illustrated. As seen in FIG. 4, the sheet 18 is generally rectangular in configuration and is provided with tab portions 18A, 18B, 18C and 18D that are arranged in matched pairs, i.e., matched pairs 18A-18B and 18C-18D, disposed on opposite edges of the sheet so that the tab portions in each of the pairs is long enough to extend across part of an associated slot (10, in FIGS. 1 and 2) toward the other tab portion in its pair in order to substantially cover the areas of the coiled conductors 6'-7 that are positioned under the locking members (e.g., the locking members 14 and 14A, shown in FIG. 1). As the description of the invention proceeds, it will be understood that other forms of tabs may be arranged on a sheet of insulating material such as the insulating paper sheet 18. For example, tabs could be designed to extend from a single side of such a sheet of insulating material, each tab being made of sufficient length to extend substantially completely across the outer circumferential surface of the coiled conductors in the winding slots, thereby to adequately insulate the locking members 14, 14A, etc. from the conductors in the desired manner that will now be explained. It should also be understood that the body portion of the sheet of insulating material 18 is preferably designed to be generally coextensive with the walls of its associted winding slot (10-13) defined by the adjacent pole sides, such as the sides of poles 2 and 3 shown in FIG. 2.

In the most preferred embodiment of the invention the tab portions (18A-18D) are each formed so that they are at least as wide as the associated locking member positioned over it, for example, the tab portions 18A and 18B shown in FIG. 2 are in the range of 1 to 3 centimeters in width so that they are slightly wider than the associated locking member 14A, measured in an axial direction to provide adequate ground protection. Moreover, the tab portions are preferably designed so that the ends thereof in each of the matched pairs 18A-18B and 18C-18D are in engagement with each other as shown in FIGS. 1 and 2. In fact, in order to make sure that such engagement is maintained when the locking members are flattened into operating position, the tab portions are preferably made long enough to slightly overlap one another in their finally assembled position in the preferred embodiment being described.

Referring now to FIG. 3 it will be seen that there is shown an enlarged view of a generally V-shaped locking member 14A which member is also illustrated in FIGS. 1 and 2. Reference is made to these figures of the drawing to describe characteristic features of the locking members (14A). Specifically, in its most preferred form the locking member 14A is formed by bending its ends 14A' and 14A" outward before the locking member is placed over the conductors 6' and 7 in the slot 10. This bending operation is done in order to position the bent portions of the locking member 14A against the insulating paper 18, i.e., tab portions 18A and 18B, respectively, while the outermost ends of the locking members are driven into engagement with the pole tip portions 2A' and 3A', etc., according to the invention. Another characteristic feature of the locking member 14A is that the angle of its apices (as defined by projecting the sides) is in the range of approximately 45° to 60°, and preferably is about 55° in the preferred embodiment, in order to assure that the locking member can be readily flattened by rapidly applying force to it with a mallet or similar tool for flattening it, as was explained more fully above in connection with the description of the method of the invention.

The locking members 14, 14A, etc. are made of a stiff, deformable non-magnetic material, such as copper bar stock. In order to preserve a desired cooling affect of the ambient gases on a largely exposed outer surface portion of the coiled conductors, the combined width of the locking members used to lock the conductors in any given slot is no more than 20 percent of the slot length, measured in an axial direction. For example, in the preferred embodiment illustrated in FIG. 1, each of the locking members 14 and 14A is between one and three centimeters in width and is long enough so that the ends thereof extend at least one centimeter under the pole tips 2A" and 3A' to assure their retention against the centrifugal forces applied to them when the rotor 1 is revolved. Also, the locking members are each spaced axially inward from the ends of the slot with which they are associated, by a distance that is at least equal to the width of the lockiing member, as measured in an axial direction.

It will be apparent to those skilled in the art from the foregoing description of the invention that various other modifications and alternative forms of it can be readily practiced using the disclosure presented herein; accordingly, it is my intention to encompass within the following claims the true scope of the invention.

What I claim as new and desire to secure by Letters Patent of the United States is:

1. In a dynamoelectric machine rotor with a plurality of salient poles and coiled conductors randomly wound on said poles, the improvement comprising a plurality of stiff, deformable locking members each positioned, respectively, to span a predetermined axially limited portion of the coiled conductors in a slot defined by two adjacent poles and to place the opposite ends of each locking member, respectively, under a tip portion of one of said adjacent poles, thereby to place each locking member in compressive engagement against a respective one of said axially limited portions of the conductor to lock them in the slot, the combined axial length of said predetermined axially limited portions comprising less than twenty percent of the axial length of said slot, and including a sheet of insulating paper disposed around the coiled conductors in said slot to insulate them from the poles defining the slot, said sheet of insulating paper being generally coextensive with the walls of said slot immediately adjacent the coiled conductors, except for tab portions of said sheet of paper that extend from at least one of the edges thereof and under said locking members thereby to insulate the locking members from the conductors.

2. An invention as defined in claim 1 wherein each of said tab portions is at least as wide as the locking member positioned over it to provide ground protection for the conductors.

3. An invention as defined in claim 2 wherein said tab portions are arranged in matched pairs on opposite edges of the sheet of insulating paper so that each tab portion in each of said pairs extends across part of the slot toward the other tab portion of its pair, thereby to substantially cover the area of said conductors under the locking member positioned over said pair.

4. An invention as defined in claim 2 wherein the ends of the tab portions in each of said pairs are in engagement with each other.

5. An invention as defined in claim 4 wherein each of said tabs is long enough to enable it to be tucked under a pole tip of the rotor to provide mechanical protection for the locking member engaging the tab.

6. An invention as defined in claim 4 wherein each of said locking members is generally flat and is spaced axially inward from the ends of said slot by a distance at least equal to the width of one of said locking members measured parallel to the longitudinal axis of the slot.

7. An invention as defined in claim 6 wherein said rotor includes at least four slots defined, respectively, by adjacent poles, and includes at least two of said locking members positioned, respectively, over the coiled conductors in each of said slots.

* * * * *